Sept. 9, 1924.

F. E. MILLER

CASH REGISTER

Filed May 23, 1922

Inventor.
FREDERICK EDWARD MILLER.
By F. N. Cornwall
Atty.

Sept. 9, 1924.

F. E. MILLER

CASH REGISTER

Filed May 23, 1922    2 Sheets-Sheet 2

1,507,749

Inventor:
FREDERICK EDWARD MILLER.

By [signature] Atty.

Patented Sept. 9, 1924.

1,507,749

UNITED STATES PATENT OFFICE.

FREDERICK EDWARD MILLER, OF ST. LOUIS, MISSOURI, ASSIGNOR TO ST. LOUIS CASH REGISTER COMPANY, INCORPORATED, OF ST. LOUIS, MISSOURI, A CORPORATION OF MISSOURI.

CASH REGISTER.

Application filed May 23, 1922. Serial No. 562,984.

*To all whom it may concern:*

Be it known that I, FREDERICK EDWARD MILLER, a citizen of the United States, residing at St. Louis, Missouri, have invented a certain new and useful Improvement in Cash Registers, of which the following is a full, clear, and exact description, such as will enable others skilled in the art to which it appertains to make and use the same, reference being had to the accompanying drawings, forming part of this application.

My invention relates to cash registers and is particularly adapted for machines of the type shown in Patten Patent No. 1,080,162, and in my prior Patent No. 1,427,311 and consists in improvements in the adding mechanism for the total amount of purchases and the number of purchases.

There are total adding cash registers now on the market which register and add ten cent amounts and multiples thereof and the intermediate five cent amounts. There are also machines which register and add ten cent amounts or multiples thereof and one cent amounts or multiples thereof. Also there are cash registers which register ten cent amounts or multiples thereof, intermediate five cent amounts, and one cent amounts or multiples thereof, but such machines are not total adders. In making a total adder of such a machine, the problem presented is the transferring to a single units counting wheel of items from two different sets of registering mechanism. While it is a comparatively simple matter to combine any odd numbers of cents with any ten cent multiple or to provide a series of five cent elements for adding intermediate nickel amounts to ten cent multiples, the combining, in a single counter mechanism, of one cent multiples, other than five cents, with a five cent amount has not been shown heretofore, and such provision is the main object of my invention.

A further object of my invention is to prevent the use of the one cent multiple mechanism in combination with or, in the five cent item, in substitution for the five cent elements.

In those cash registers which indicate the number of operations as well as the amounts of purchases, it is desirable to distinguish between the number of purchases and the number of no sale or similar operations, and still another object of my invention is to provide, in a machine of the type described in the above-mentioned patents, a simple efficient mechanism for separately adding the total number of operations and the number of no sale or similar operations.

In the accompanying drawings, which illustrate a selected embodiment of my invention, whereby these objects are attained, as well as others apparent from the details disclosed,—

Figure 1:
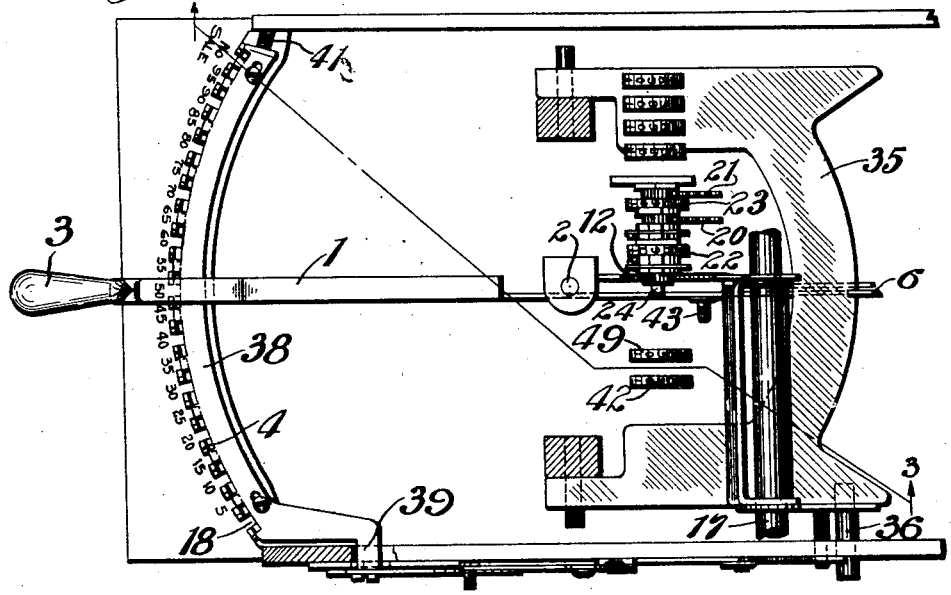
Figure 1 is a top view of as much of the mechanism of a cash register of the type referred to as is necessary to illustrate my invention.

A distinguishing feature of the type of cash register shown in these drawings consists in the provision of an operating lever 1 pivoted at 2 between its ends and provided at its outer end with a handle 3 whereby it may be moved transversely of the machine to different amount indicating positions over a series of notches between teeth 4 formed on a positioning shelf 5, such shifting moving the inner end 6 of the lever beneath different indicating tabs one of which is indicated at 7. These tabs, as described in my earlier Patent No. 1,427,311, are arranged in banks of one cent multiples up to nine; ten cent multiples up to ninety; intermediate five cent multiples and one dollar multiples up to any reasonable amount. This shifting of the lever also moves its inner end 6 beneath different portions of a suitable counter operating mechanism, partly indicated at 8, which registers and adds those amounts which are most often required; for instance, five cents, ten cents, fifteen cents, etc., up to ninety-five cents. Positioned on the opposite sides of the machine are means for setting up dollars and odd cents, respectively, in counter operating mechanisms.

Figure 2:
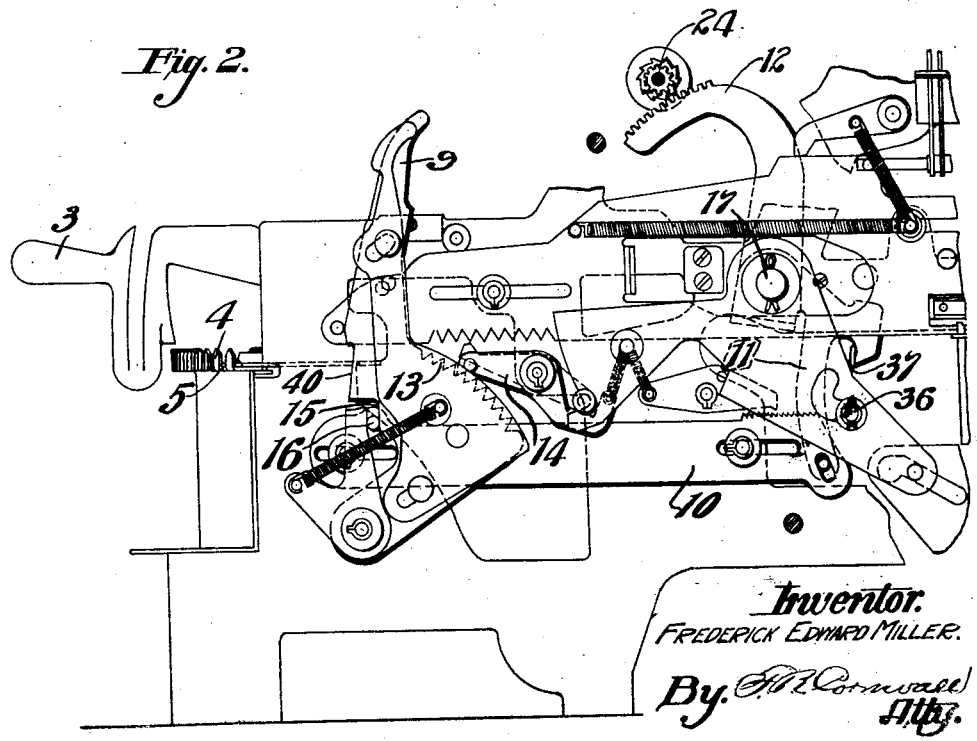
Figure 2 is a side elevation of the same.

In Figure 2, the one cent setting up means is detailed and consists essentially of a lever 9 which retracts a link 10 pivotally connected through a crank 11 to a shaft 17 which mounts segment gear 12 containing teeth adapted to intermesh with the teeth of a counter wheel when handle 3 is depressed and to rotate the wheel according to the distance which the segment has been moved by link 10 and lever 9 in the setting up operation. This rotation being provided by the rise of a U-shaped frame 35 which carries a pin 36 which is adapted to engage notch 37 in crank 11 and raise the latter. In Figure 2 lever 9 has been pulled forward to the three cent position on a scale, (not shown) which has moved three teeth 13 positioned on its lower arcuate portion over a retaining pawl 14 and by engagement of shoulder 15 with pin 16, has pulled link 10 and crank 11 to the left, thereby rotating shaft 17 and moving segment 12 so that the latter, when meshed with the counter wheel and returned to its normal position, will rotate the counter wheel three teeth.

Figure 3:
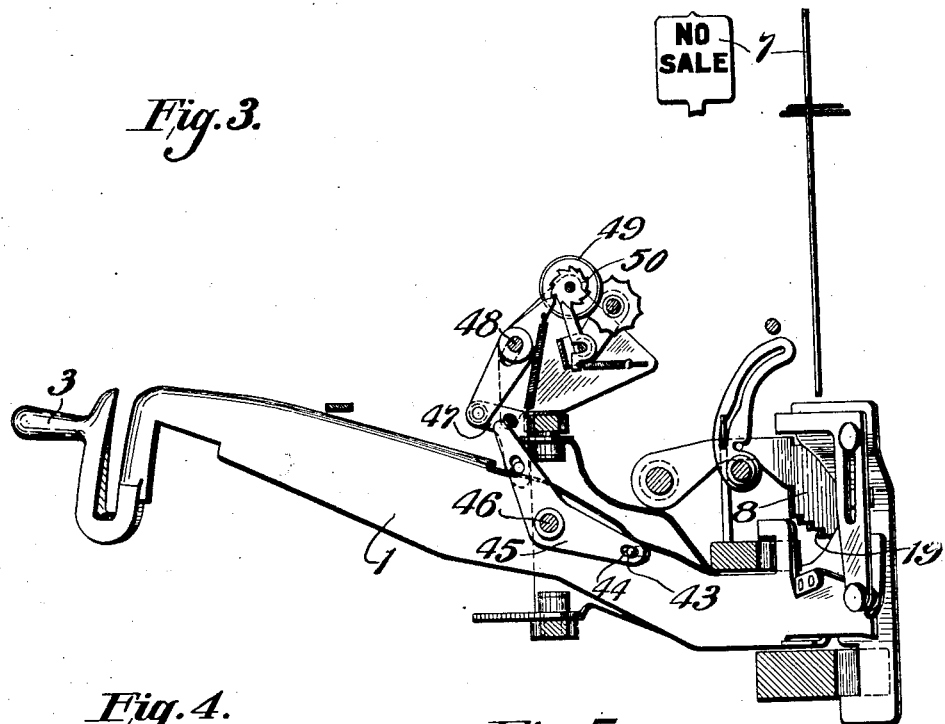
Figure 3 is a section taken on line 3—3 of Figure 1, with the operating handle in its extreme lefthand position.

When the operating lever 1 is moved to the extreme righthand notch 18, its inner end does not actuate any indicating or registering mechanism until some amount has been set up either in the dollar or one cent items,—in fact, is locked against depression until some such amount has been set up. When positioned over any of the other notches between teeth 4, the inner end of the lever engages one of the downwardly facing shoulders 19 (Figure 3) on the counter operating yoke 8 to rotate segment 21 (Figure 1), which resembles segment 12, but engages a different pinion. Segment 20 is also operated, when lever 1 is pivoted over the five, fifteen, twenty-five cent, etc. notches, by engagement of lever 1 with a member similar to yoke 8 but not here shown; this mechanism not forming part of the present invention and being detailed in the above mentioned patent to Patten. Segment 21 only is operated when the lever is pivoted over the ten, twenty, thirty, etc. notches. The rotation of segment 20 rotates counter wheel 22 and the rotation of segment 21 rotates counter wheel 23, 22 being the units counter and 23 the tens counter.

In previous machines it has been the practice, where odd cents registering items were included, to set up the amounts with lever 9 and then depress handle 3 over the tens notch, corresponding to the tens in the purchase amount. For instance, the central position of the lever shown in Figure 1 would cause fifty cents to be registered when the handle is depressed if no additional amount was set up in the cents mechanism. With the latter moved to three cents, as shown in Figure 2, the total register would be fifty-three cents, that is, three would be added on counter wheel 22 and five on counter 23.

Figure 4:
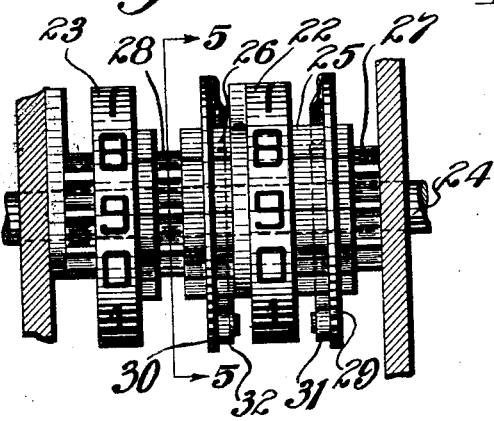
Figure 4 is an enlarged detail of a portion of the counting mechanism.
Figure 5:
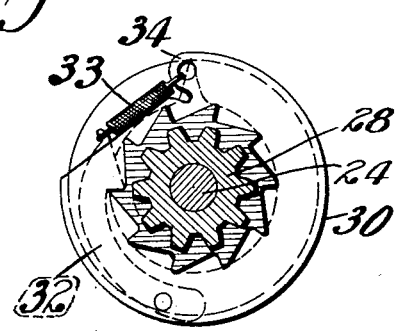
Figure 5 is a transverse section taken on line 5—5 of Figure 4.

Machines in which this operation could be performed did not contain five cent elements intermediate the ten cent elements as are provided in my machine. To render such a combination practical is the function of the flexible counter, detailed in Figures 4 and 5 which is mounted upon shaft 24 and contains the counter wheel 22. The latter has fixed to its opposite sides ratchet wheels 25 and 26, respectively. Counter wheel 22 and ratchet wheels 25 and 26 are rotatably mounted upon shaft 24. Adjacent to counter wheel 22 and the ratchet wheels 25 and 26 are pinions 27 and 28, respectively, each of which has fixed thereto a disk 29 and 30, respectively, upon which is pivoted an arcuate pawl 31 and 32, respectively, adapted to engage the corresponding ratchet wheel on counter wheel 22. These pawls are yieldingly held in engagement with the ratchet wheel by means of springs 33 secured to suitable projections 34 upon the disks. Obviously rotation of either pinion 27 or 28 will rotate its disk and pawl and the adjacent ratchet wheel, thereby rotating counter wheel 22. Counter wheel 22, however, may be rotated in one direction without rotation of one of the disks and pinions as the corresponding pawl will ride freely over the ratchet teeth. In other words, either one of the segments 12 or 20 may operate its pinion 27 or 28 and the counter wheel 22 independently of the other. For instance, handle 3 may be moved over the forty-five cent notch and depressed, thereby rotating segment 20, pinion 28, disk 30, pawl 32 and counter wheel 22, ratchet 25 on the latter riding under pawl 31, or handle 3 may be depressed over the fifty cent notch, or lever 9 may be moved to the three cent position and handle 3 depressed over the fifty cent notch, whereupon segment 21 will rotate the ten cent counter 23 five teeth and pin 36 will actuate segment 12 to rotate counter 22 three teeth.

It is necessary to insure the combination of one cent units with ten cent units only, that is, to prevent the simultaneous operation of the one cent segment 12 and the intermediate five cent segment 20. This is done by mounting an arcuate bar 38 on the positioning shelf 5 by means of a pin and slot arrangement, whereby the bar may be slid along the shelf for a limited distance. The outer edge of bar 38 is notched with its notches being of a width corresponding to three of the notches between teeth 4. One end of bar 38 is provided with a lug 39 which projects through the side frame of the machine in a position in which it is adapted to be engaged and pushed to the left by the forward edge 40 of lever 9 as the latter is retracted to set up an odd cent amount. This engagement shoves bar 38 to the left so that it blocks out every alternate notch on the positioning shelf, thus preventing depression of the handle at these notches.

It will be understood that the five cent, fifteen cent, and twenty-five cent, etc., notches are the ones blocked out. It will, therefore, be impossible for an operator to combine forty-five and three cents, but instead must add forty and eight cents to register forty-eight cents. A spring 41 compressed between the opposite end of bar 38 and the other side of the machine yieldingly maintains the bar in its extreme right-hand position, except when the bar is engaged by the side of lever 9.

Another feature of my machine is the separation of the total number of purchases and the total number of no sale operations. Each time handle 3 is depressed, the inner end of the operating lever raising member 35 actuates a counter 42 to move the latter one tooth. When handle 3 is moved to its extreme lefthand position, a pin 43 on lever 1 (Figure 1) enters a slot 44 in a bell crank 45 pivoted on shaft 46 and as the lever is depressed rotates the bell crank and through it a second bell crank 47 pivoted at 48 to actuate a no sale counter 49 through a ratchet 50 secured to the latter. Each operation of bell crank 45 will rotate this no sale counter one tooth.

While some reference has been made to the complete operation of the machine in registering and adding operations, this specification is not intended as a full or complete description as the above-mentioned patents more fully illustrate and describe this mechanism. The novel features disclosed in this application and claimed hereinafter are contained in the flexible units counter device, in the five cent and one cent combination preventive arrangement, and in the no sale operation register. Obviously, radical changes in the operation of the register's general mechanism may be made without affecting my present invention applied thereto, as well as the usual modifications in the details of construction of my improvement as are comprehended in the following claims.

I claim as my invention:

1. In a total adding cash register, a units counter, purchase amount registering mechanism arranged in odd multiples of five cent intervals, separate purchase amount registering mechanism arranged in one cent intervals, and means for adding unit amounts set up in either mechanism in said counter.

2. In a total adding cash register, a units counter, purchase amount registering mechanism arranged in ten cent intervals, purchase amount registering mechanism arranged in ten cent intervals between said first-mentioned ten cent intervals, purchase amount registering mechanism arranged in one cent intervals, means for combining said first-mentioned ten cent mechanism and said one cent mechanism, and means for preventing the combining of said second-mentioned ten cent mechanism and one cent mechanism.

3. In a cash register, a digits counter, and two distinct mechanisms adapted to actuate said counter in adding operations independently of each other.

4. In a cash register, a digits counter, and two distinct mechanisms adapted to actuate said counter to different degrees in adding operations independently of each other.

5. In a total adding cash register, a units counter, purchase amount registering mechanism arranged in multiples of ten cents, purchase amount registering mechanism arranged in the odd multiples of five cents, purchase amount registering mechanism arranged in multiples of one cent, means for simultaneous operation of said ten cent multiple mechanism and said one cent multiple mechanism, and means for preventing simultaneous operation of said five cent multiple mechanism and said one cent multiple mechanism.

6. In a cash register, a counter wheel for a particular denomination, a purchase amount registering mechanism for said denomination including a ratchet movable to operate said wheel and adapted to permit rotation of said wheel independently of said registering mechanism, and a second registering mechanism for said denomination including operating means for said counter wheel.

7. In a cash register, a counter wheel for a particular denomination, a purchase amount registering mechanism for said denomination including a ratchet movable to operate said wheel and adapted to permit rotation of said wheel independently of said registering mechanism, and a second registering mechanism for said denomination including a ratchet movable to operate said wheel and adapted to permit rotation of said wheel independently of said first-mentioned registering mechanism.

8. In a cash register, a counter wheel for one denomination, and a plurality of purchase amount registering mechanisms for said denomination each adapted to operate said wheel in the same direction independently of the other.

9. In a cash register, an adding wheel for a particular denomination provided with ratchet wheels fixed on its opposite sides, independent registering mechanisms for said denomination each having a pawl adapted to engage one of said ratchet wheels to operate said adding wheel or to ride over its ratchet wheel to permit free movement of the latter in advance of the pawl.

10. In a total adding cash register, a flexible unit adding wheel comprising a counter wheel, ratchet wheels fixed to either side of the counter wheel, pinions rotatable relative to said counter wheel and ratchet wheels, individual pawls pivotally mounted on said pinions and adapted to engage said ratchet wheels independently of each other.

11. In a total adding cash register, a flexible unit adding wheel comprising a counter wheel, ratchet wheels fixed to either side of the counter wheel, pinions rotatable relative to said counter wheel and ratchet wheels, individual pawls pivotally mounted on said pinions and adapted to engage said ratchet wheels independently of each other, and units setting up gear segments adapted to cooperate independently and said pinions to operate said counter wheel.

12. In a cash register, a bank of ten cent multiple indicating tabs, a bank of intermediate five cent indicating tabs, a bank of one cent multiple indicating tabs, and means for simultaneously displaying said ten cent multiple indicating tabs, and said one cent multiple indicating tabs, and means for preventing simultaneous displaying of said intermediate five cent indicating tabs and said one cent multiple indicating tabs.

13. In a cash register, ten cent multiple registering mechanism, intermediate five cent registering mechanism, one cent multiple registering mechanism, and means for combining said ten cent multiple registering mechanism and said one cent multiple registering mechanism, and means for preventing the combination of said intermediate five cent registering mechanism and said one cent multiple registering mechanism.

14. In a cash register, a series of purchase amount indicating tabs arranged in one cent multiples, a series of purchase amount indicating tabs arranged in five cent multiples, and means for displaying selective ones of said one cent multiple tabs with any alternate one of said five cent multiple tabs only.

15. In a cash register, a series of purchase amount indicating tabs arranged in one cent multiples, a series of purchase amount indicating tabs arranged in greater multiples, and means for displaying selective ones of said one cent multiple tabs with any alternate one of said greater multiple tabs only.

16. In a cash register, a series of purchase amount indicating tabs arranged in one cent multiples, a series of greater purchase amount indicating tabs, and means for displaying selective ones of said one cent multiple tabs with predetermined ones of said greater amount tabs only.

17. In a cash register, a lever shiftable to selective positions in each of which it may be depressed to operate purchase amount registering mechanism arranged in five cent multiples, means for setting up registering mechanism for amounts in one cent multiples to be registered simultaneous with and in addition to said first-mentioned registering mechanism, and a device actuated by said means for preventing depression of said lever in every alternate one of said selected positions.

18. In a cash register, a lever shiftable to selective positions in each of which it may be depressed to operate purchase amount indicating mechanism arranged in five cent multiples, means for setting up indicating mechanism for amounts in one cent multiples to be indicated simultaneous with and in addition to said first-mentioned indicating mechanism, and a device actuated by said means for preventing depression of said lever in every alternate one of said selected positions.

19. In a cash register, a positioning shelf, a series of notches therein, a shiftable lever adapted to be depressed in any of said notches to operate the register, a bar overlying said shelf and provided with notches normally aligned with the notches in said shelf, purchase amount setting up mechanism, and means actuated by operation of said mechanism for disaligning said bar notches with some of said shelf notches.

20. In a cash register, a positioning shelf, a series of notches therein, a shiftable lever adapted to be depressed between any of said notches to operate the register, a bar overlying said shelf and provided with wider notches, each normally overlying two adjacent notches in said shelf, purchase amount setting up mechanism, and a lever engageable with said bar to move the latter relative to said shelf to cover up every other notch in said shelf.

21. In a cash register, a counter for the total number of transactions registered, a supplementary counter for the number of a particular transaction registered, a horizontal shiftable and vertically depressible lever for actuating the register including said counters, a pivoted slotted crank connected to said supplementary counter, and a lateral projection on said lever for entering the slot in said crank at one lever position only.

22. In a total adding cash register, a counter for one denomination, two registering mechanisms for said denomination, and means for operating said counter similarly by either of said mechanisms independently of the other of said mechanisms.

23. In a total adding cash register, a counter for one denomination, two registering mechanisms for said denomination, means whereby operation of either of said mechanisms will operate said counter similarly.

24. In a cash register, a digits counter, and two distinct mechanisms adapted to actuate said counter in adding operations independently of each other and means for preventing simultaneous actuation of said counter by both of said mechanisms.

25. In a cash register, a digits counter, and two distinct mechanisms adapted to actuate said counter in adding operations independently of each other, at least one of said mechanisms being adapted to selectively actuate said counter to different degrees.

26. In a cash register, a digits counter, and two distinct mechanisms adapted to actuate said counter in adding operations independently of each other, and a common manipulating member for said mechanisms.

In testimony whereof I hereunto affix my signature this 17th day of May, 1922.

FREDERICK EDWARD MILLER.